United States Patent
Mariotto et al.

(10) Patent No.: US 10,787,273 B2
(45) Date of Patent: Sep. 29, 2020

(54) ELECTRICAL ARCHITECTURE WITH PAIRED SECONDARY ELECTRICAL NETWORKS FOR STARTING ENGINES OF AN AIRCRAFT

(71) Applicant: AIRBUS HELICOPTERS, Marignane (FR)

(72) Inventors: Damien Mariotto, Lambesc (FR); Michel Jamot, Aix en Provence (FR); Jean-Francois Logeais, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 273 days.

(21) Appl. No.: 15/656,387

(22) Filed: Jul. 21, 2017

(65) Prior Publication Data

US 2018/0029721 A1 Feb. 1, 2018

(30) Foreign Application Priority Data

Jul. 29, 2016 (FR) ..................................... 16 01172

(51) Int. Cl.
*B64D 31/00* (2006.01)
*B64D 41/00* (2006.01)
(Continued)

(52) U.S. Cl.
CPC ............. *B64D 31/00* (2013.01); *B64D 41/00* (2013.01); *H02J 3/32* (2013.01); *H02J 3/38* (2013.01);
(Continued)

(58) Field of Classification Search
USPC ......................................................... 307/9.1
See application file for complete search history.

(56) References Cited

U.S. PATENT DOCUMENTS 4,081,037 A * 3/1978 Jonsson .............. B25B 23/1456
173/1
5,325,042 A 6/1994 Murugan
(Continued)

FOREIGN PATENT DOCUMENTS

EP 1130737 9/2001
EP 2740191 A2 6/2014
(Continued)

OTHER PUBLICATIONS

European Search Report for European Application No. EP 17182287.7, Completed by the European Patent Office dated Apr. 24, 2018, 6 Pages.
(Continued)

*Primary Examiner* — Rexford N Barnie
*Assistant Examiner* — Xuan Ly
(74) *Attorney, Agent, or Firm* — Brooks Kushman P.C.

(57) ABSTRACT

An electrical architecture for an aircraft having a primary three-phase electrical network powering a transformer-rectifier unit serving to power two secondary DC electrical networks. Each of the two secondary electrical networks includes a contactor electrically connected to a generator-starter. The contactors are linked in pairs to prevent them from being closed simultaneously. The second secondary network powers the generator-starter to start a fuel-burning engine. The first secondary network can be powered by the generator-starter to power electrical components. A secondary voltage of the second secondary electrical network is greater than the voltage of the first secondary electrical network, thus making it possible to optimize the weight of the electrical architecture. The two secondary electrical networks may also be powered from autonomous sources of electricity as a replacement for the primary network to power the generator-starter and the electrical components.

20 Claims, 6 Drawing Sheets

(51) Int. Cl.
- *H02J 4/00* (2006.01)
- *H02J 3/38* (2006.01)
- *H02J 3/32* (2006.01)
- *B64D 35/08* (2006.01)

(52) U.S. Cl.
CPC ............... *H02J 4/00* (2013.01); *B64D 35/08* (2013.01); *B64D 2221/00* (2013.01)

(56) References Cited

U.S. PATENT DOCUMENTS

| | | |
|---|---|---|
| 7,615,892 B2 | 11/2009 | Anghel et al. |
| 8,089,170 B2 | 1/2012 | Patterson |
| 8,339,810 B2 | 12/2012 | Ratnaparkhi et al. |
| 9,592,907 B2 | 3/2017 | Vieillard et al. |
| 2009/0015063 A1* | 1/2009 | Michalko ................. H02J 5/00 307/19 |
| 2010/0193630 A1* | 8/2010 | Duces ...................... H02J 3/02 244/58 |
| 2013/0106372 A1 | 5/2013 | Sawyers |
| 2014/0138479 A1* | 5/2014 | Vieillard ............... B64C 25/405 244/50 |

FOREIGN PATENT DOCUMENTS

| | | |
|---|---|---|
| FR | 2901431 | 11/2007 |
| FR | 2962407 A1 | 1/2012 |

OTHER PUBLICATIONS

French Search Report for French Application No. FR 1601172, Completed by the French Patent Office on Apr. 12, 2017, 11 Pages.

\* cited by examiner

ELECTRICAL ARCHITECTURE WITH PAIRED SECONDARY ELECTRICAL NETWORKS FOR STARTING ENGINES OF AN AIRCRAFT

CROSS-REFERENCE TO RELATED APPLICATIONS

This application claims priority to French patent application No. FR 1601172 filed on Jul. 29, 2016, the disclosure of which is incorporated in its entirety by reference herein.

BACKGROUND OF THE INVENTION

(1) Field of the Invention

The present invention relates to the technical field of systems for distributing and generating electricity. The present invention relates more particularly to the technical field of electrical architectures for aircraft.

The invention relates to an electrical architecture for an aircraft having two secondary electrical networks respectively for starting the power plant of the aircraft and for electrically powering electrical equipment on board the aircraft. The electrical architecture is intended more particularly for rotary wing aircraft.

The invention also relates to a method of managing such an electrical architecture while starting the power plant of the aircraft.

(2) Description of Related Art

A power plant for a rotary wing aircraft generally comprises a main mechanical power transmission gearbox (MGB), at least one main fuel-burning engine suitable for driving the MGB, and at least one electrical starter enabling the main engine to be started. The power plant may include one starter for each main engine.

The MGB in a rotary wing aircraft serves to drive at least one main rotor of the rotary wing aircraft in rotation via an outlet shaft, and possibly also to drive an anti-torque rotor. For this purpose, each main engine is generally of high power, e.g. about 2500 horsepower (2500 hp), i.e. about 1850 kilowatts (1850 kW).

A starter is mechanically connected to a main engine and is generally constituted by a reversible electrical machine referred to as a "generator-starter". The generator-starter has two functions. Firstly, in starter mode, it serves to start the main engine to which it is connected, and secondly, in generator mode, when driven in rotation by the main engine, it serves to generate electricity for an on-board electrical network of the aircraft. However, the generator-starter does not deliver any mechanical power to the MGB. It is also possible to use an alternator-starter instead of a generator-starter.

An aircraft also has an electrical architecture firstly for powering each starter or generator-starter in order to start each main engine of the power plant of the aircraft, and secondly for powering electrical equipment of the aircraft. In certain aircraft, such an architecture also has two electrical networks, namely a primary electrical network at low voltage (LV), and a secondary electrical network at very low voltage (VLV).

In a low voltage primary electrical network, it is considered that the voltage of direct current (DC) electricity lies in the range 120 volts (120 V) to 1500 V, whereas the voltage for alternating current (AC) electricity lies in the range 50 V to 1000 V. Likewise, in a very low voltage secondary electrical network, it is considered that the voltage of DC is less than or equal to 120 V, while the voltage of AC is less than or equal to 50 V.

The low voltage primary electrical network is generally powered electrically by an alternator that is mechanically driven by the MGB when at least one engine of the power plant has started. The very low voltage secondary electrical network may be powered by one or more electricity storage devices of the electrical architecture, by the low voltage primary electrical network, by means of a transformer rectifier unit (TRU), or indeed by one or more generator-starters of the power plant operating in generator mode.

Each electricity storage device constitutes a source of electricity for the very low voltage secondary electrical network when each of the main engines of the power plant is stopped, at least so long as at least one electricity storage device contains electrical energy. The low voltage primary electrical network constitutes another source of electricity as soon as the MGB is being driven in rotation, as does a generator-starter as soon as a main engine is operating. The very low voltage secondary electrical network thus serves to power electrical equipment of the aircraft, and in this respect it is referred to as the "onboard electrical network" or more simply below as the "onboard network".

Furthermore, for simplification purposes, an electrical network is often referred to below more simply merely as a "network".

By way of example, in compliance with the EN-2282 standard used in the field of aviation, an onboard network supplies DC at a voltage of 28 V, and the low voltage primary network supplies three-phase AC at a voltage of 115 V. A storage device may be rechargeable or non-rechargeable and may be constituted by a battery, a thermopile, or any other device capable of supplying electrical power in autonomous manner. Another source of electricity that is suitable for use for the onboard network, in particular while the aircraft is on the ground, is a ground power unit (GPU) that is then connected to the aircraft and to its onboard network, in particular.

The prior art includes several documents describing electrical architectures for vehicles, and in particular Documents EP 1 130 737 and US 2010/0193630.

Document EP 1 130 737 describes an electrical installation for a motor vehicle having two electrical networks at different voltages, two electrical energy storage devices, an electricity generator, a reversible converter, and a computer controlling the converter. The two electrical energy storage devices are connected together in series and arranged between the two electrical networks and between two terminals of the converter. A third terminal of the converter is connected to the electrical connection interconnecting the two storage devices. The computer controls the converter firstly so as to optimize the use and the recharging of the two electrical energy storage devices as a function of the electricity being consumed by the two electrical networks, and secondly to power one electrical network from the other electrical network.

Document US 2010/0193630 describes an electrical architecture for an aircraft having electricity distribution networks for high power loads and electricity distribution networks for conventional loads. Each channel is powered by a dedicated electricity generator.

Also known is Document FR 2 901 431, which describes a circuit for converting AC into DC. That converter circuit includes in particular a power transformer, a rectifier constituted by diodes, and a capacitor of large capacitance connected between the output terminals of the rectifier.

In addition, an aircraft power plant sometimes includes an auxiliary fuel-burning engine for driving the MGB, which then drives an alternator. The auxiliary engine constitutes an auxiliary power unit (APU). Such an alternator can also be connected to the APU directly, e.g. in airplanes. The APU is a source of electricity for the low voltage primary network.

Furthermore, starting a main engine requires a large amount of mechanical power, generally more than 12 kW, for a duration that may continue for several tens of seconds. This power is generally supplied by the onboard network which then supplies electricity at very high current in order to reach the required power level. For example, for an onboard network supplying DC at a voltage of 28 V, the current is of the order of 1000 amps (1000 A).

Such a current requires the entire electrical architecture of the aircraft to be dimensioned accordingly, and in particular the electric cables that serve to convey those electric currents, the storage devices, and the starters, thereby giving rise to considerable weight for that electrical architecture. In order to reduce that weight, it is possible to power each starter by the low voltage primary network in order to reduce the magnitude of the electric current needed for starting an engine.

Nevertheless, in such an electrical architecture, the very low voltage generator-starter needs to include converter means firstly in order to be powered by the low voltage primary network for starting an engine, and secondly in order to constitute a source of electricity for the onboard network, which converter means tend to reduce very considerably any weight saving that might be achieved.

The prior art includes several documents describing electrical architectures for facilitating starting an aircraft engine.

In particular, Document U.S. Pat. No. 8,089,170 describes an electrical architecture comprising a plurality of subsystems each having a respective generator-starter and a power converter unit. The sub-systems are arranged in parallel and enable the torque needed for starting an engine to be shared over all of the generator-starters, each of which thus supplies a low level of torque.

Document U.S. Pat. No. 7,615,892 describes an electrical architecture having a multitude of converter modules arranged in parallel and controlled independently of one another. Those converter modules serve firstly to start an engine via a generator-starter, and secondly to supply power to other equipment. In the event of one or more converter modules failing, other modules can take over in order to mitigate such failures without challenging the operation of the electrical architecture.

Furthermore, Document U.S. Pat. No. 8,339,810 describes a main power unit for a vehicle on the ground, such as an airplane. That power unit accepts a wide range of AC power supplies as inputs and supplies several DC power supplies as outputs. That main power unit includes a rectifier for transforming AC into DC, a high frequency converter for decoupling, and a transformer capable of delivering DC power at different voltages, e.g. in order to power firstly a starter of an engine and secondly equipment on board the vehicle.

Furthermore, Document U.S. Pat. No. 5,325,042 describes an electrical starter device for an APU that serves to minimize degradation in the quality of the power supply signal and to minimize the emission of electromagnetic interference (EMI). The system comprises in particular a TRU for transforming three-phase AC into DC of variable voltage. The TRU has three-phase primary windings, two groups of three-phase secondary windings that are respectively in a star configuration and in a delta configuration, two rectifier bridges connected to respective secondary winding groups, and a capacitor.

Finally, Document US 2013/0106372 describes a regulated voltage transformer capable of using an input voltage to supply two output voltages. The transformer is active and therefore consumes energy in order to regulate the output voltages, which two output voltages are independent and not related to each other by a multiplier factor.

BRIEF SUMMARY OF THE INVENTION

An object of the present invention is thus to propose an electrical architecture having paired secondary networks for an aircraft that makes it possible to avoid the above-mentioned limitations, and in particular to optimize the dimensioning of the electrical architecture by separating the stages of starting the main engines of the power plant and of electrically powering the onboard network of the aircraft over two distinct secondary networks. The present invention also provides a method of managing such an electrical architecture having paired secondary networks for starting a main fuel-burning engine.

According to the invention, an electrical architecture having paired secondary networks for an aircraft comprises:

two secondary electrical networks suitable for delivering respective secondary powers at respective secondary voltages;

one or more electrical components; and at least one source of electricity connected to at least one secondary electrical network.

The electrical architecture having paired secondary networks is for supplying electricity onboard an aircraft and in particular for powering electrical equipment of the aircraft. A source of electricity supplies the power needed to the secondary networks in order to power that equipment. A source of electricity may be a rechargeable electrical energy storage device, such as a battery, a non-rechargeable electrical energy storage device, such as a thermopile, or indeed a generator driven by a main mechanical power transmission gearbox, an auxiliary power unit, or a ground power unit.

This electrical architecture having paired secondary networks is remarkable in that a common electrical component is electrically connected to both the secondary networks, each secondary network includes a contactor enabling each secondary network to be electrically connected with the common electrical component, and the contactors being interlinked so that one contactor cannot be closed so long as the other contactor is not open so that the common electrical component cannot be electrically connected simultaneously to both the secondary networks.

The contactors may be linked together mechanically, electrically, or indeed electronically. The linking between the contactors makes it impossible for two contactors to be closed simultaneously. In contrast, two contactors can be open simultaneously, in particular over a transient stage. This logic for closing and opening the contactors thus makes it possible to avoid propagating a voltage from one secondary network to another secondary network. As a result, this logic for closing and opening the contactors makes it possible to achieve a main object of making the secondary network safe in order to protect the equipment connected to each secondary network from a voltage for which it is not qualified and that might destroy the equipment. This logic for closing and opening the contactors thus operates with "exclusive OR" logic.

The electrical architecture with paired secondary networks of the invention advantageously makes it possible to link together electrically one or more common components depending on circumstances, or else to enable each of these components to be used by both secondary networks.

This functionality is particularly useful for common components that have two different stages of operation, e.g. a first stage of operation that draws a very large current and that therefore requires high currents to be delivered, and a second stage of operation that consumes less current or indeed that generates electricity.

This applies for example to a generator-starter mechanically connected to a fuel-burning engine that needs a high level of electrical power for starting the engine and that subsequently operates in electricity generator mode once the engine has started. Specifically, a first secondary network of the electrical architecture can be connected to the generator-starter operating in generator mode, and a second secondary network of the electrical architecture having paired secondary networks can be used to power the generator-starter in order to start the engine. The second secondary network is then used specifically for starting the engine(s) of an aircraft, while the first secondary network constitutes the onboard network of the aircraft for powering the electrical equipment of the aircraft, and itself powered, amongst other sources, by the generator-starter, which then constitutes a source of electricity for the first secondary network.

Furthermore, the stage of starting an engine is a stage of short duration, of the order of a few seconds to a few tens of seconds. Consequently, even if a high current does indeed flow in the second secondary network in order to power the generator-starter, that high current flows for a short duration only. Consequently, the dimensioning of the second secondary network can be optimized, in particular in terms of the sections of electric cables conveying the high current, thereby limiting the weight of those electric cables.

Likewise, in the onboard network that does not power the generator-starter, but that powers only the electrical equipment of the aircraft, the sections of the electric cables in that onboard network can be small and optimized, likewise reducing the weight of those electric cables and thus the weight of the electrical architecture of the aircraft.

Furthermore, the voltage of the onboard network of an aircraft generally complies with the EN-2282 standard, and delivers DC at a voltage of 28 V.

Specifically, in a first electrical architecture having paired secondary networks, the voltages and currents delivered by the first secondary network and by the second secondary network may be equal and comply with that EN-2282 standard. Optimizing that first electrical architecture with paired secondary networks thus consists mainly in the length of time each of the two secondary networks is in use, the second secondary network being dimensioned for and used with high-current DC over a short duration, while the first secondary network is dimensioned for and used with lower-current DC.

Advantageously, in a second electrical architecture having paired secondary networks, the first secondary network delivers secondary electrical power at a first secondary voltage that is different from the second secondary voltage of secondary power delivered by the second secondary network. Preferably, the first secondary network delivers DC at a first secondary voltage equal to 28 V in compliance with the EN-2282 standard, and the second secondary network delivers DC at a second secondary voltage that is strictly greater than the first secondary voltage, e.g. equal to twice the first voltage, i.e. 56 V. Both of these secondary networks lie in the range of very low voltage networks.

These voltages are nominal values that might fluctuate while the aircraft is in operation.

Consequently, since the second secondary voltage is higher, the secondary power delivered by the second secondary network can be reduced in order to deliver the same power. Specifically, the secondary power delivered by the second secondary network may be divided by two when the second secondary voltage is equal to twice the voltage conventionally used and as defined by the EN-2282 standard, for example.

Consequently, in addition to the dimensions of electric cables, the generator-starter may also be optimized as a result of a reduction in the current used for powering it, thereby leading to a reduction in the weight of the generator-starter and in the weight of the electrical architecture having paired secondary networks.

Furthermore, a network needs to include or to be connected to a source of electricity in order to be able to deliver electricity. As mentioned above, the generator-starter is a source of electricity for the first secondary network, i.e. the onboard network, but only once the engine has started. Specifically, the first secondary network needs to include at least one other source of electricity in order to be able to deliver electricity so long as the engine has not started, while the aircraft is on the ground. An onboard network generally includes an electrical energy storage device as a source of electricity. Furthermore, the onboard network of an aircraft may be connected, while the aircraft is on the ground, to a ground power supply.

The second secondary network also needs to be connected to a source of electricity in order to power the generator-starter electrically so as to enable the engine to be started. Nevertheless, this need is restricted solely to the starting stage. Several embodiments are possible for connecting the second secondary network with a source of electricity.

In a first embodiment, the second secondary network includes at least one autonomous source of electricity, such as an electrical energy storage device, for acting on its own to power the generator-starter and consequently starting an engine. Nevertheless, since the generator-starter is electrically powered for only a short duration, the weight of an autonomous source of electricity might be penalizing for the aircraft given that it is used little. Furthermore, when the second secondary voltage is strictly greater than the first secondary voltage, and thus different from the voltages recommended by the EN-2282 standard, such an autonomous source of electricity is generally non-standard and could thus be expensive.

In a second embodiment, the second secondary network is connected to at least one autonomous source of electricity only while the aircraft is on the ground in order to power only the generator-starter, and consequently enables each engine to be started. Thereafter, once each engine has started, the second embodiment is connected to no source of electricity, thereby advantageously avoiding penalizing the weight of the aircraft in flight. By way of example, the autonomous source of electricity may be an electrical energy storage device or else a ground power unit.

In a third embodiment, the source of electricity of the second secondary network may also be constituted in part by the first secondary network. The electrical architecture having paired secondary networks then includes at least two autonomous sources of electricity: a first source of electricity being arranged on the first secondary network and supplying the first secondary voltage to the first secondary network; and a second source of electricity being arranged between the first secondary network and the second secondary network and supplying a voltage equal to the difference between the second secondary voltage and the first secondary voltage. As a result, the two sources of electricity operate in series and together they supply the second secondary voltage to the second secondary network. Because of the first source of electricity and the second source of electricity operating jointly, the second secondary network can power the generator-starter, and consequently can start each engine.

Advantageously, the weight associated specifically with electrically powering the second secondary network is small, since it is constituted only by the weight of the second source of electricity, the first source of electricity being used jointly therewith firstly to power the first secondary network and secondly to power the second secondary network. This second source of electricity may be removable and may be installed while the aircraft is on the ground.

Advantageously, if the second secondary voltage of the second secondary network is equal to twice the voltage recommended by the EN-2282 standard, the first source of electricity and the second source of electricity may be identical, e.g. being constituted by standard batteries delivering DC at a voltage equal to 28 V. Consequently, the second source of electricity may optionally act as a replacement source of electricity for the first source of electricity.

In a fourth embodiment, a source of electricity of the second secondary network may also be constituted by another network of electrical architecture having paired secondary networks. Specifically, for certain aircraft, this electrical architecture includes a primary network connected to at least one source of electricity supplying three-phase AC at a primary voltage. This primary network is a low voltage network and often has as its source of electricity a generator that is driven mechanically directly by an auxiliary power unit present on board the aircraft, or else by a main mechanical power transmission gearbox.

The electrical architecture having paired secondary networks in this fourth embodiment then includes a primary network having a source of electricity and a transformer-rectifier unit (TRU) arranged between the primary network and the two secondary networks. The TRU transforms the three-phase AC at a primary voltage in the primary network into two DC outputs with respective secondary voltages corresponding to the needs of each of the secondary networks. Specifically, the second secondary network can power the generator-starter as a result of the primary network and a TRU, and consequently can start each engine. The first secondary network is also powered by the primary network and the TRU and consequently serves to power electrical components.

Such a TRU comprises:

three-phase primary windings in a star configuration or in a delta configuration and connected to the primary network; and two secondary assemblies each provided respectively with at least one group of three-phase secondary windings in a star configuration or in a delta configuration, together with a rectifier bridge arranged between each group of three-phase secondary windings and a secondary network so that secondary DC at a secondary voltage powers each secondary network.

The TRU also includes an element made of ferromagnetic material that provides magnetic coupling and consequently that transfers energy between the three-phase primary windings and the group of three-phase secondary windings. The element made of ferromagnetic material may for example be a core made of ferromagnetic material.

Furthermore, each secondary assembly is made up of groups of three-phase secondary windings that are at a mutual phase offset of $\pi/(3 \times n)$, where $\underline{n}$ is an integer equal to the number of groups of three-phase secondary windings included in the secondary assembly.

In order to supply DC powering each secondary network in a manner that is sufficiently stable and of quality that is satisfactory with respect to the recommendations of the EN-2282 standard, the number $\underline{n}$ of groups of three-phase secondary windings is greater than or equal to 2.

Preferably, this number $\underline{n}$ of groups of three-phase secondary windings is equal to 2. Thus, each secondary assembly has two groups of three-phase secondary windings that are at a mutual phase offset of $\pi/6$, being respectively in a star configuration and in a delta configuration, and being connected to a six-phase rectifier bridge.

In addition, the TRU may include inductors referred to as "interphases" arranged between a rectifier bridge and a secondary network in order to reduce currents flowing between bridges.

The two secondary assemblies of the TRU are preferably electrically connected in series, the first secondary voltage of the first secondary network being the voltage across the terminals of a first secondary assembly, while the second secondary voltage of the second secondary network is the voltage across the terminals of the first secondary assembly and of a second secondary assembly. Advantageously, this series connection makes it possible to share the first secondary assembly which is used for both secondary networks, the second secondary voltage being strictly greater than the first secondary voltage, as mentioned above.

Nevertheless, the secondary assemblies need not be connected in series, the secondary voltages of the first and second secondary networks then being independent. Specifically, the first secondary voltage is then the voltage across the terminals of the first secondary assembly, while the second secondary voltage is the voltage across the terminals of the second secondary assembly.

In addition, whatever the embodiment of the invention, one or more secondary networks may be added to the electrical architecture of the invention, e.g. as a function in particular of a need for some specific additional voltage.

The present invention also provides a method of managing an electrical architecture having paired secondary networks for starting a fuel-burning engine of an aircraft, the electrical architecture having paired secondary networks comprising:

two secondary networks each suitable for delivering secondary electrical power at a respective secondary voltage;

one or more electrical components, at least one of which electrical component is common and electrically connected to at least two secondary networks;

at least one source of electricity connected to at least one secondary network; and at least two contactors arranged on respective secondary networks, each contactor serving to connect the secondary network on which it is arranged electrically to a common electrical component, the contactors being linked together in pairs in such a manner that a contactor cannot be closed so long as the other contactor of the pair is not open.

The method of managing an electrical architecture having paired secondary networks for starting an engine of an aircraft comprises the following steps:

a first step of electrically powering a second secondary network;

a second step of controlling the opening of a first contactor arranged on a first secondary network;

a third step of closing a second contactor arranged on the second secondary network;

a fourth step of electrically powering the common component by the second secondary network;

a fifth step of opening the second contactor;

a sixth step of closing the first contactor; and a seventh step of electrically connecting the common component with the first secondary network.

Furthermore, the second step of controlling the opening of a first contactor prevents execution of the third step of closing a second contactor so long as the first contactor is not open, thus avoiding both contactors being closed simultaneously.

In addition, the common component may be a generator-starter connected to an engine. The fourth step of electrically powering the generator-starter is then a step of starting the engine, and the seventh step of electrically connecting the common component is a step of generating electricity for powering the first secondary network.

BRIEF DESCRIPTION OF THE DRAWINGS

The invention and its advantages appear in greater detail from the context of the following description of embodiments given by way of illustration and with reference to the accompanying figures, in which.

DETAILED DESCRIPTION OF THE INVENTION

Elements that are present in more than one of the figures are given the same references in each of them.

Figure 1:
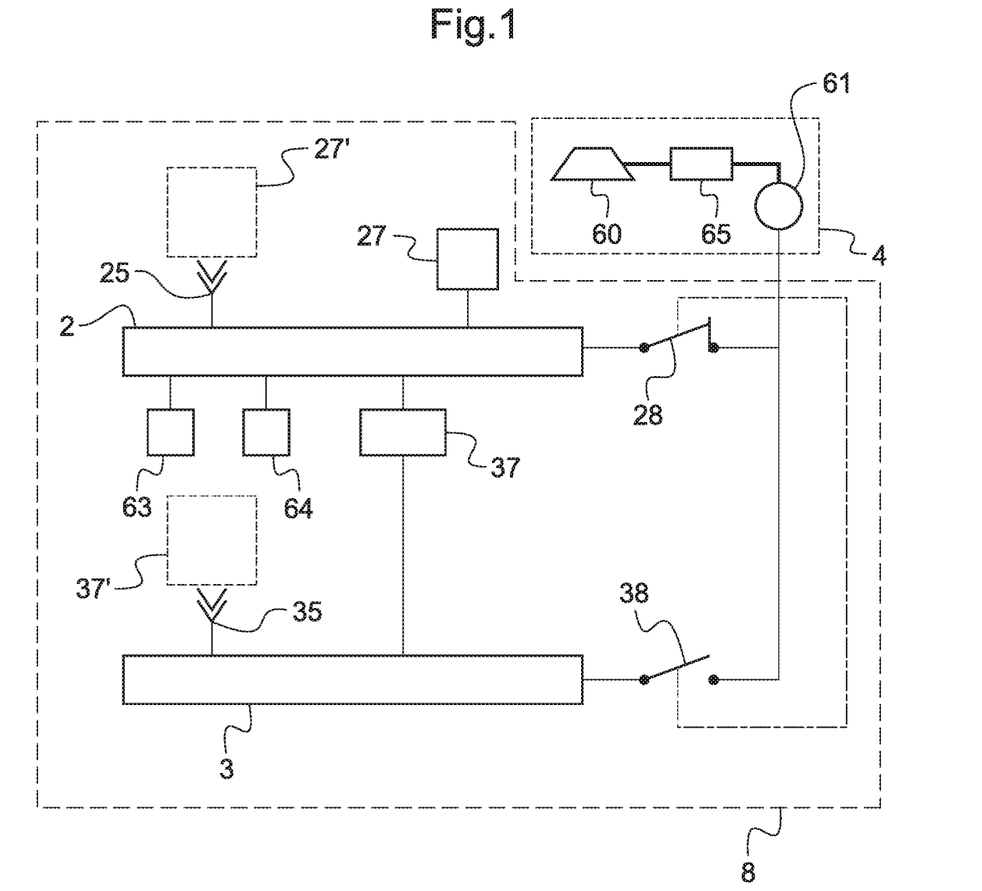
FIGS. 1 to 3 show several examples of an electrical architecture with paired secondary networks for an aircraft.

FIG. 1 shows a first example of an electrical architecture 8 having paired secondary networks, including two secondary electrical networks 2, 3 connected to a power plant 4.

Figure 2:
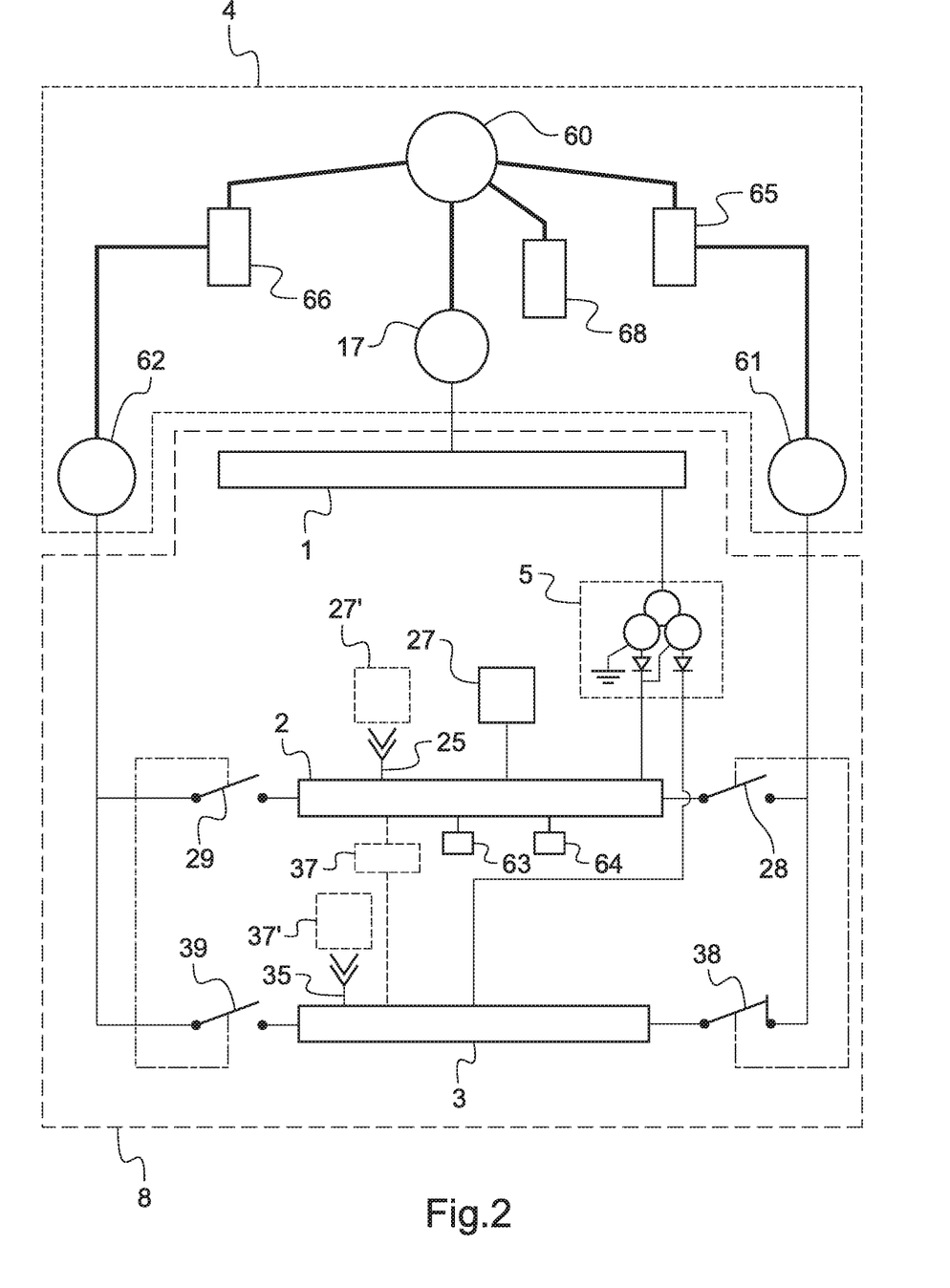

FIG. 2 shows a second example of an electrical architecture 8 having paired secondary networks, comprising in particular a primary electrical network 1, and two secondary electrical networks 2, 3, all three networks being connected to a power plant 4.

Figure 3:
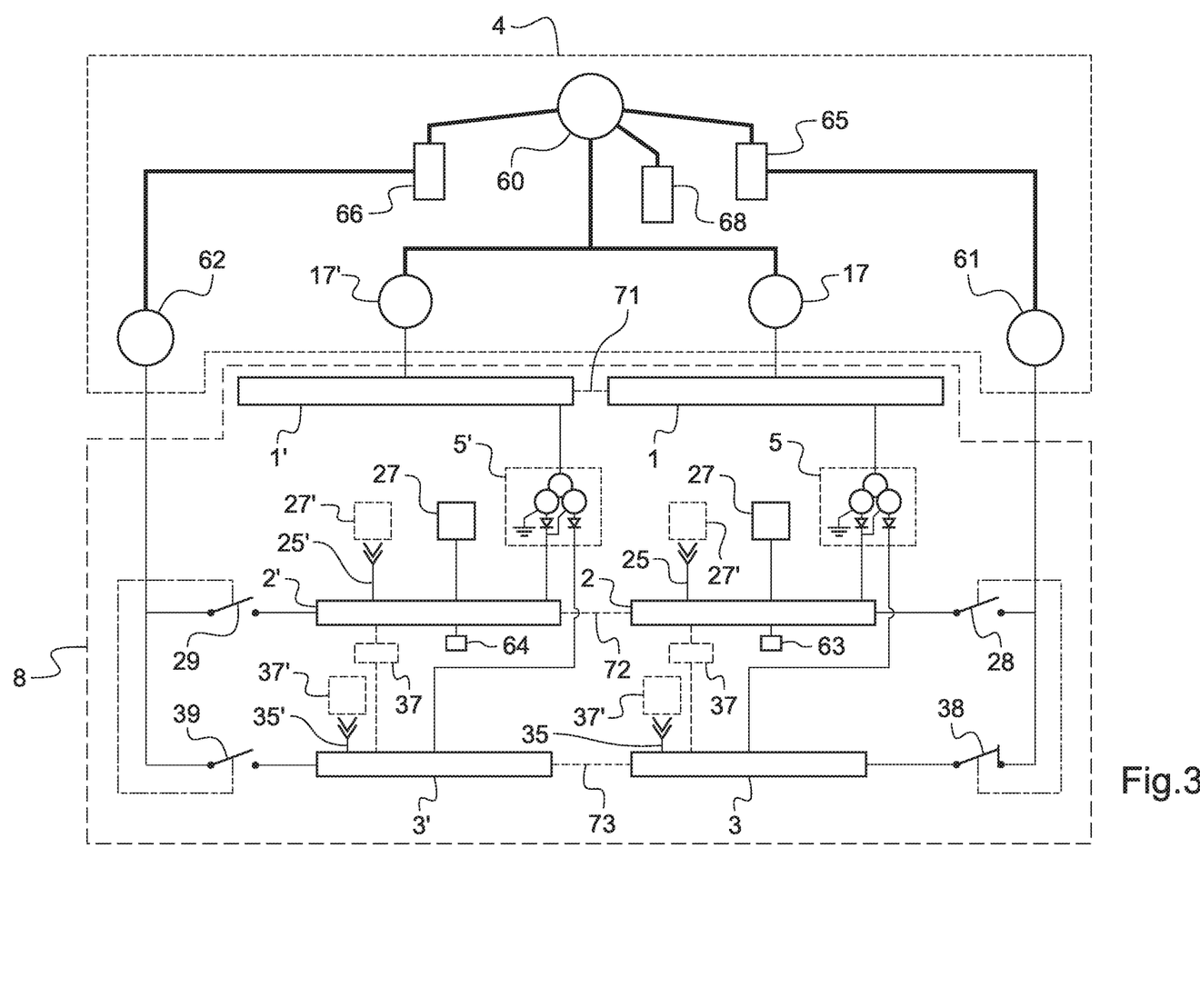

FIG. 3 shows a third example of an electrical architecture 8 having paired secondary networks, specifically comprising two primary electrical networks 1, 1', and four secondary electrical networks 2, 3 and 2', 3', these six networks being connected to a power plant 4.

These three examples of an electrical architecture 8 having paired secondary networks are for installing in an aircraft, e.g. a rotary wing aircraft.

Each power plant 4 includes at least one fuel-burning engine 65, 66 such as a turboshaft engine driving a main mechanical power transmission gearbox (MGB) 60. Each engine 65, 66 is mechanically connected to a generator-starter 61, 62 serving firstly to start the engine 65, 66 when the generator-starter 61, 62 is electrically powered and drives the engine 65, 66 in rotation, and secondly to generate electricity when the engine 65, 66 has started and is driving the generator-starter 61, 62 in rotation.

In a manner that is common to these examples, the secondary networks 2, 3, 2', 3' are very low voltage networks, comprise a first secondary network 2, 2' delivering first secondary electrical power at a first secondary voltage US1 equal to 28 V, in compliance with the EN-2282 standard, and a second secondary network 3, 3' delivering second secondary electrical power at a second secondary voltage US2 equal to 56 V, corresponding to twice the first secondary voltage US1.

The first secondary network 2, 2' has a first battery 27 supplying 28 V and constituting a source of electricity. The first secondary network 2, 2' also has an input terminal 25 for use, when the aircraft is on the ground, for connecting to a ground power unit (GPU) 27' capable of supplying electricity at 28 V and suitable for constituting an additional source of electricity. The first secondary network 2, 2' constitutes an onboard network of the aircraft and it is connected to electrical components 63, 64 of the aircraft.

The second secondary network 3, 3' also has an input terminal 35 for connection, when the aircraft is on the ground, to a GPU 37' capable of supplying electricity at 56 V and suitable for constituting a source of electricity.

The first secondary network 2, 2' has at least one first contactor 28, 29 and the second secondary network 3, 3' has at least one second contactor 38, 39. A first contactor 28, 29 is linked to a second contactor 38, 39 in such a manner that the two contactors 28, 29, 38, 39 that are linked together cannot both be closed simultaneously. Specifically, since at least one of the two contactors 28, 38 is always open, it is not possible for any short circuit to appear between the two secondary networks 2, 3.

In a first example of an electrical architecture 8 having paired secondary networks, as shown in FIG. 1, the electrical architecture 8 has a second battery 37 supplying 28 V, constituting a source of electricity, and arranged between the first secondary network 2 and the second secondary network 3. This second battery 37 thus operates in series with the first battery 27 of the first secondary network 2 in order to co-operate with the first battery 27 to supply the second secondary voltage US2 of 56 V to the second secondary network 3. The electrical architecture 8 has a first contactor 28 and a second contactor 38 that are linked together.

The power plant 4 of this first example of an electrical architecture 8 has only one engine 65 connected to a generator-starter 61. This generator-starter 61 is connected to the first secondary network 2 by the first contactor 28 and to the second secondary network 3 by the second contactor 38.

As shown in FIG. 1, the first contactor 28 is closed and the first secondary electrical network 2 is electrically connected to the generator-starter 61, while the second contactor 38 is open and the second secondary electrical network 3 is not electrically connected to the generator-starter 61. This first configuration of the contactors 28 and 38 corresponds to the generator-starter 61 operating in a generator stage of operation, thereby supplying electricity to the first secondary network 2 serving firstly to power the electrical components 63, 64 of the first secondary electrical network 2, and secondly to recharge the first battery 27 and the second battery 37.

Conversely, when the second contactor 38 is closed, the second secondary electrical network 3 is electrically connected to the generator-starter 61. Since the two contactors 28 and 38 are linked together, the first contactor 28 is then open and the first secondary electrical network 2 is not electrically connected to the generator-starter 61. This second configuration of the contactors 28, 38 corresponds to the generator-starter 61 operating in a motor stage of operation while being powered electrically from the second secondary network 3. The first secondary network then operates with the electricity supplied by the first battery 27 in order to power the electrical components 63, 64.

Furthermore, the linking between the two contactors 28 and advantageously avoids both contactors 28 and 38 being closed simultaneously, thereby avoiding firstly any risk of a short circuit between the two secondary networks 2, 3, and secondly avoiding powering the electrical components 63 and 64 with an unsuitable voltage, specifically the second secondary voltage US2. In contrast, the linking does enable both contactors 28 and 38 to be open simultaneously while changing the states of the contactors 28 and 38.

By using these two contactors 28 and 38 that are linked together, the second secondary network 3 has the sole function of electrically powering the generator-starter 61 with the second voltage US2. The first secondary network 2 is used as the onboard network for electrically powering electrical components 63, 64 of the aircraft at the first secondary voltage US1. The second secondary voltage US2, which is strictly greater than the first secondary voltage US1, i.e. the voltage conventionally used for powering a generator-starter, serves to reduce the magnitude of the electric current powering the generator-starter 61. Consequently, the electric cables and the generator-starter 61 can be dimensioned so as to be better adapted to these conditions, thereby reducing the weights of these electric cables and of the generator-starter 61.

In the second example of an electrical architecture 8 having paired secondary networks, as shown in FIG. 2, the electrical architecture 8 has a primary network 1 in addition to the two secondary networks 2 and 3. The two secondary networks 2 and 3 are substantially identical to those in the first example, the only difference being the presence of two contactors 28, 29, 38, 39 for each secondary network 2, 3, i.e. four contactors 28, 29, 38, 39 for the electrical architecture 8, taken as a whole.

The power plant 4 in this second example has two engines 65, 66 that are connected to respective generator-starters 61 and 62. The power plant 4 also has an APU 68 and an alternator 17, the APU 68 being capable of driving the MGB 60 in rotation when none of the engines 65 or 66 is in operation, and the alternator 17 is driven in rotation by the MGB 60. Specifically, the alternator 17 is electrically connected to the primary network 1 and can deliver three-phase AC to the primary network 1 at a primary voltage UP equal to 115 V when the MGB 60 is driven either by one or by both engines 65, 66, or else by the APU 68.

Each generator-starter 61, 62 is connected to the first secondary network 2 respectively via a first contactor 28, 29 and to the second secondary network 3 respectively via a second contactor 38, 39. The two contactors 28, 29, 38, 39 of the pair of secondary networks 2, 3 that are associated with a respective generator-starter 61, 62 are linked together as mentioned above for the first example.

The operation of the pair of secondary networks 2, 3 is identical to the first example of the electrical architecture 8 having paired secondary networks. The two pairs of contactors 28, 29, 38, 39 connected to respective ones of the generator-starters 61, 62 serve to power each generator-starter 61, 62 in alternation, thereby starting the two engines 65, 66 in alternation.

In addition, as shown in FIG. 2, the second contactor 38 connected to the first generator-starter 61 is closed in order to start the second engine 66, while the first contactor 28 is open, which means it cannot power the electrical components 63, 64. Thereafter, once the first engine 65 has started, the corresponding first generator-starter 61 can power the first secondary network 2, the second contactor 38 then being open, and then the corresponding first contactor 28 is closed so as to be able to power the electrical components 63, 64. The other contactors 29, 39 are open, as shown in FIG. 2, with the second generator-starter 62 not being connected electrically to either of the first and second secondary networks 2 and 3.

The use of the second battery 37 for jointly powering the second secondary network 3 with the first battery 27 of the first secondary network 1 may be optional. Specifically, the primary network 1 may be used as a source of electricity for the first secondary network 2 and for the second secondary network 3. For this purpose, the electrical architecture 8 includes a TRU 5 arranged between the primary network 1 and the two secondary networks 2, 3.

Figure 4:
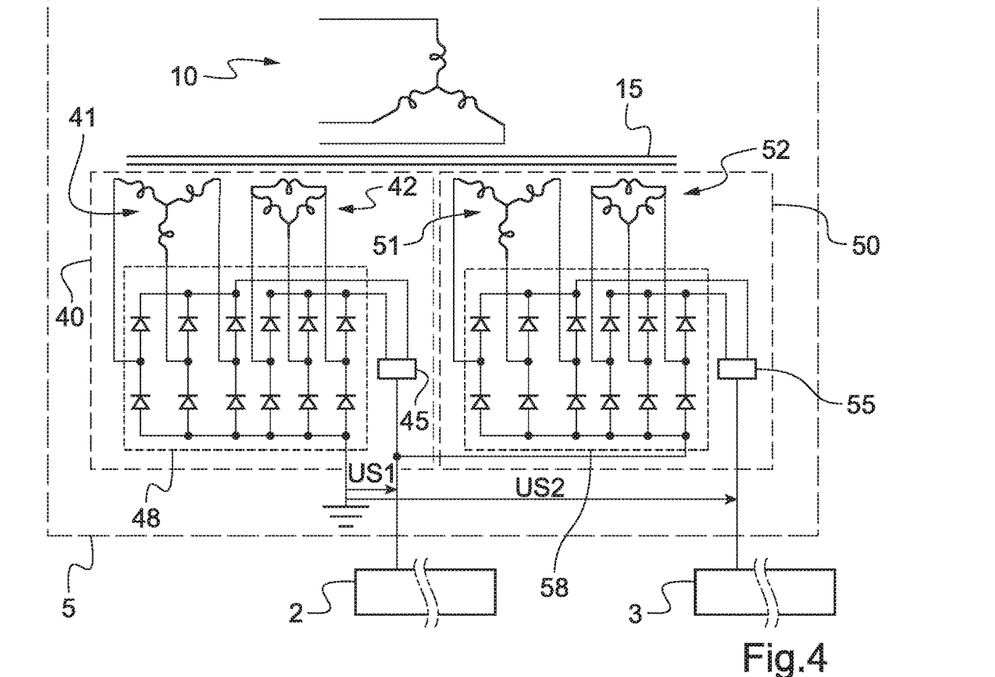
FIGS. 4 and 5 are two detail views of two transformer rectifier units.
Figure 5:
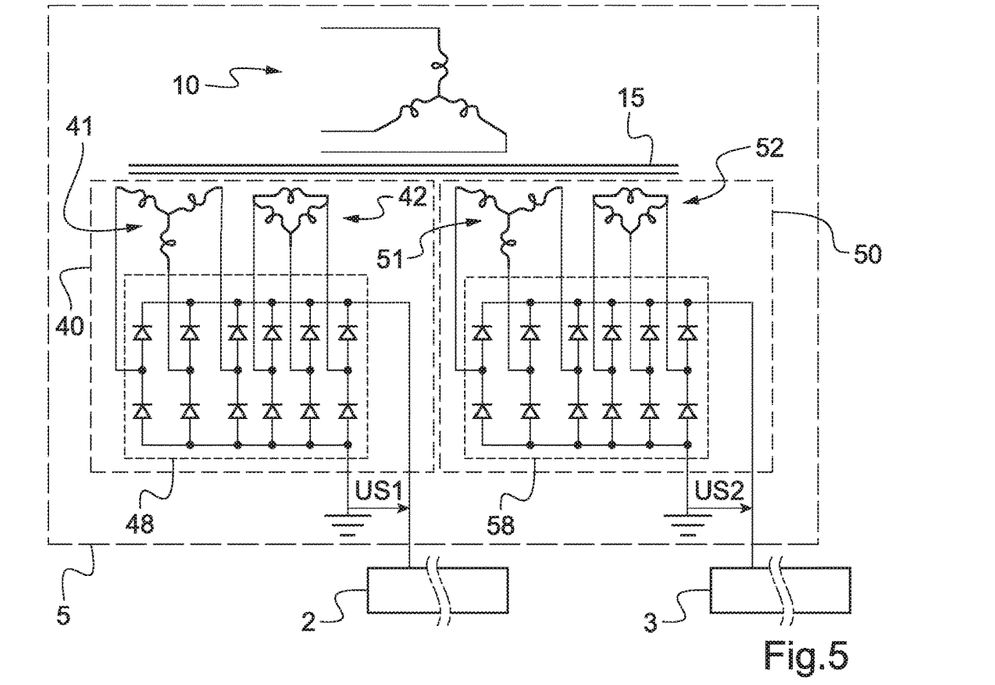

The TRU 5 is shown in detail in FIGS. 4 and 5 and serves to take AC input and to deliver simultaneously two DC outputs at the different secondary voltages US1 and US2. This TRU 5 comprises:

three-phase primary windings 10 in a star configuration and connected to the primary electrical network 1;

two secondary assemblies 40, 50 each provided respectively with two groups of three-phase secondary windings 41, 42, 51, 52 respectively in a star configuration and in a delta configuration, together with a six-phase rectifier bridge 48, 58 connected to the two groups of three-phase secondary windings 41, 42, 51, 52 and arranged between two groups of three-phase secondary windings 41, 42, 51, 52 and a secondary electrical network 2, 3 so that secondary DC at a secondary voltage US1 or US2 powers each secondary electrical network 2, 3; and a core 15 of ferromagnetic material providing electromagnetic coupling between the three-phase primary winding 10 and the group of three-phase secondary windings 41, 42, 51, 52.

In FIG. 4, the two secondary assemblies 40, 50 are electrically connected in series. Consequently, the first secondary voltage US1 of the first secondary network 2 is the voltage across the terminals of the first secondary assembly 40, while the second secondary voltage US2 of the second secondary network 3 is the voltage across the terminals of the first secondary assembly 40 plus the voltage across the terminals of the second secondary assembly 50. The second secondary voltage US2 is the sum of the voltages across the terminals of each of the two secondary assemblies 40, 50 and is strictly greater than the first secondary voltage US1.

In FIG. 5, the two secondary assemblies 40, 50 are not electrically connected in series. The secondary voltages US1 and US2 of the first and second secondary networks 2, 3 are then independent and equal respectively to the voltages across the terminals of respective ones of the secondary assemblies 40, 50.

Furthermore, the TRU 5 shown in FIG. 4 includes "interphase" inductors 45, 55 arranged respectively between each six-phase rectifier bridge 48, 58 and each secondary network 2, 3.

In the third example of an electrical architecture 8 having paired secondary networks, as shown in FIG. 3, the electrical architecture 8 is an association of two substantially identical electrical architectures of the second example that are arranged in symmetrical manner. This electrical architecture 8 in this third example has two primary networks 1 and 1', and four secondary networks 2, 2' and 3, 3'.

The power plant 4 of this third example has two engines 65, 66 each connected to a respective generator-starter 61,

62. The power plant 4 also has an APU 68 and two alternators 17, 17'. Each alternator 17, 17' is driven in rotation by the MGB 60 and is electrically connected to a respective primary network 1 or 1'. Each alternator 17, 17' is thus capable of delivering three-phase AC at a primary voltage UP equal to 115 V for a primary network 1 or 1' when the MGB 60 is driven in rotation.

Each primary network 1 and 1' is connected to a respective pair of secondary networks 2 & 3 and 2' & 3' via a respective TRU 5 or 5', as in the second example. The secondary networks 2, 2' and 3, 3' are substantially identical to the second example, the only difference being the presence of a single contactor 28, 29, 38, 39 for each secondary network 2, 2' or 3, 3', i.e. four contactors 28, 29, 38, 39 for the electrical architecture 8.

Each generator-starter 61, 62 is connected to a first secondary network 2, 2' via a respective first contactor 28, 29 and to a second secondary network 3, 3' via a respective second contactor 38, 39. The pairs of contactors 28, 29, 38, 39 of the two secondary networks 2, 2' and 3, 3' connected to respective ones of the generator-starters 61, 62 are themselves linked together as mentioned above.

Specifically, each assembly constituted by a primary network 1 or 1', two secondary networks 2 & 3 and 2' & 3', and the power plant 4 functions in a manner that is analogous to the second example of an electrical architecture 8.

The use of these two assemblies advantageously makes it possible to manage the starting of each engine 65, 66 independently from a second secondary network 3, 3' and to manage electrically powering each first secondary network 2, 2'. Thus, each assembly can mitigate a failure of the other assembly and continue to power a first secondary network 2, 2' electrically in order to power the electrical components 63, 64 of the aircraft.

In addition, optional connections 71, 72, 73 are arranged respectively between the two primary networks 1 and 1' between the two first secondary networks 2, 2', and between the two second secondary networks 3, 3'. These optional connections 71, 72, 73 may be activated as a function of a failure affecting the electrical architecture 8.

Figure 6:
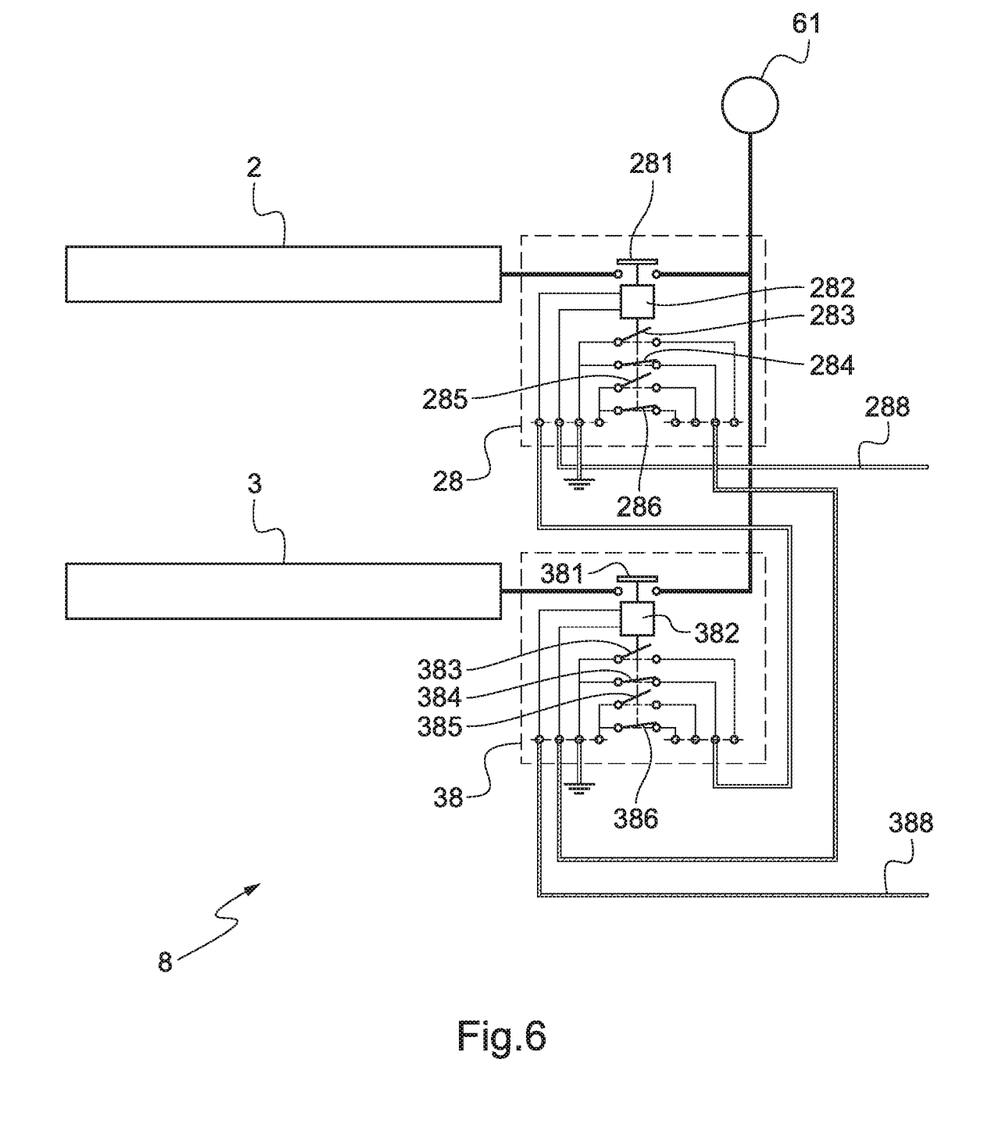
FIGS. 6 and 7 are two views of connections between the contactors of an electrical architecture having paired secondary networks.
Figure 7:
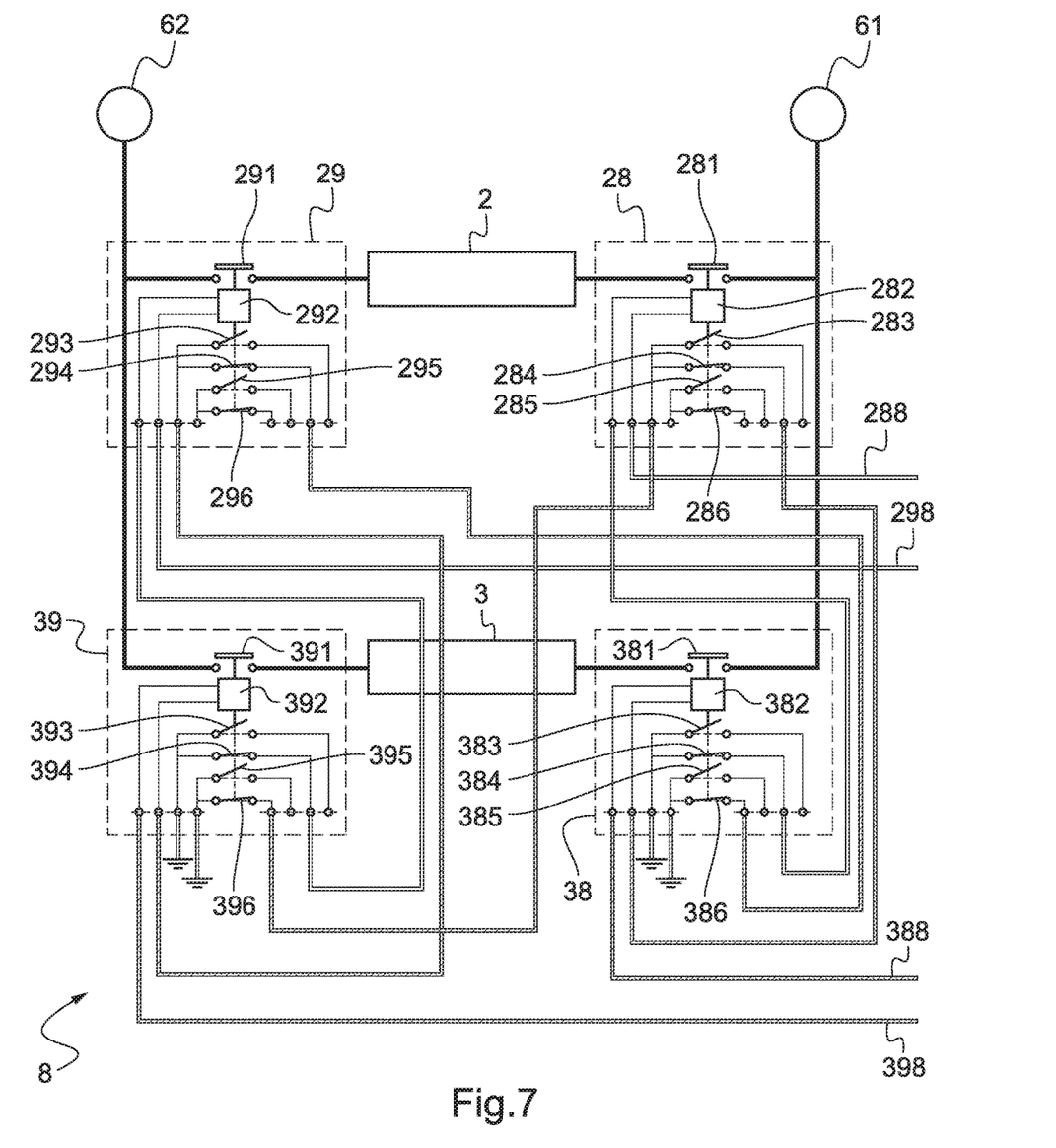

FIGS. 6 and 7 show in detail the contactors 28, 29, 38, 39 of an electrical architecture 8 having paired secondary networks, together with the electrical connections interconnecting these contactors 28, 29, 38, 39 in order to enable their particular mode of operation.

The contactors 28, 38 and their electrical connections shown in FIG. 6 are for the first example of an electrical architecture 8 having paired secondary networks as shown in FIG. 1. In FIG. 6, the electrical architecture 8 is shown in simplified manner, with only the first secondary network 2, the second secondary network 3, and the generator-starter 61 being shown, together with the contactors 28, 38.

The contactors 28, 29, 38, 39 and their electrical connections shown in FIG. 7 are for the second and third examples of an electrical architecture 8 having paired secondary networks as shown respectively in FIGS. 2 and 3. In FIG. 7, the electrical architecture 8 is shown in simplified manner, with only one first secondary network 2, one second secondary network 3, and the two generator-starters 61 and 62 being shown, together with the contactors 28, 29, 38, 39. In order to return exactly to the third example of an electrical architecture 8 having paired secondary networks, each secondary network 2, 3 should be duplicated so as to form four distinct secondary networks, 2, 2' and 3, 3'.

In common in both FIGS. 6 and 7, a contactor 28, 29, 38, 39 comprises a power switch 281, 291, 381, 391, four auxiliary contacts 283, 293, 383, 393, 284, 294, 384, 394, 285, 295, 385, 395, 286, 296, 386, 396, a coil 282, 292, 382, 392, and terminals connected respectively to the auxiliary contacts 283, 293, 383, 393, 284, 294, 384, 394, 285, 295, 385, 395, 286, 296, 386, 396 and to the coil 282, 292, 382, 392.

The power switch 281, 291, 381, 391 serves to open and close the electrical connection to which the contactor 28, 29, 38, is connected, i.e. in the present example the electrical connection connecting a secondary network 2, 2', 3, 3' with a respective generator-starter 61, 62.

The auxiliary contacts of a contactor 28, 29, 38, 39 serve to supply information about the state of the power switch 281, 291, 381, 391, i.e. whether the power switch 281, 291, 381, 391 is open or else closed, by means of the terminals to which they are connected. For this purpose, two first auxiliary contacts 283, 293, 383, 393, 285, 295, 385, 395 are open when the power switch 281, 291, 381, 391 is open, while the two second auxiliary contacts 284, 294, 384, 394, 286, 296, 386, 396 are closed.

When powered, the coil 282, 292, 382, 392 serves to modify simultaneously the state of the power switch 281, 291, 381, 391 and the state of each auxiliary contact. Specifically, when the coil 282, 292, 382, 392 is powered, the power switch 281, 291, 381, 391 goes from the open state to the closed state as do the first auxiliary contacts 283, 293, 383, 393, 285, 295, 385, 395, while the second auxiliary contacts 284, 294, 384, 394, 286, 296, 386, 396 go from the closed state to the open state.

The contactors 28, 38 applicable to the first example of an electrical architecture 8 having paired secondary networks and as shown in FIG. 6 are powered by respective control circuits 288, 388 in order to cause the corresponding power switch 281, 381 to be closed. Each control circuit 288, 388 for controlling a contactor 28, 38 is connected firstly to the terminals powering the coil 282, 383 of the contactor 28, 38, and secondly to the terminals of a second auxiliary contact 284, 384 of the other contactor 28, 38. As a result, the power switch 281, 381 of a contactor 28, 38 can be closed only when the power switch 281, 381 of the other contactor 28, 38 is open, thereby preventing both contactors 28 and 38 being closed simultaneously.

The contactors 28, 29, 38, 39 applicable to the second and third examples of an electrical architecture 8 having paired secondary networks, and as shown in FIG. 7, are powered by respective control circuits 288, 298, 388, 398 in order to cause their power switches 281, 291, 381, 391 to be closed. Each control circuit 288, 298, 388, 398 of a contactor 28, 29, 38, 39 is connected firstly to the terminals powering the coil 282, 292, 382, 392 of the contactor 28, 29, 38, 39, and also to the terminals of a second auxiliary contact 284, 294, 384, 394 of one or two other contactors 28, 29, 38, 39.

Specifically, the control circuit 288, 298 powering a contactor 28, 29 for respectively connecting a first secondary network 2, 2' to a generator-starter 61, 62 in generator mode is connected firstly to the terminals powering the coil 282, 292 of the contactor 28, 29, and secondly to the terminals of a second auxiliary contact 384, 394 of a contactor 38, 39 that is for connecting respectively a second secondary network 3, 3' to the same generator-starter 61, 62 in order to power it for the purpose of starting an engine 65, 66. As a result, the power switch 281, 291 of such a contactor 28, 29 can close only when the power switch 381, 391 of the other contactor 38, 39 connected to the same generator-starter 61, 62 is open, thereby preventing a contactor 28, 29 connected to a generator-starter 61, 62 being closed while another contactor 38, 39 connected to the same generator-starter 61, 62 is already closed.

Furthermore, the control circuit 388, 398 powering a contactor 38, 39 for connecting respectively a second secondary network 3, 3' to a generator-starter 61, 62 in order to power it for starting an engine 65, 66 is connected firstly to the terminals powering the coil 382, 392 of that contactor 38, 39, and secondly to the terminals of a second auxiliary contact 284, 294 of a contactor 28, 29 for connecting respectively a first secondary network 2, 2' to the same generator-starter 61, 62 in generator mode, and to the terminals of another second auxiliary contact 384, 394 of a contactor 38, 39 for connecting respectively a second secondary network 3, 3' to another generator-starter 61, 62 in order to power it for starting another engine 65, 66.

As a result, the power switch 381, 391 of such a contactor 38, 39 can be closed only when the power switch 281, 291 of the other contactor 28, 29 connected to the same generator-starter 61, 62 is open and when the power switch 381, 391 of another contactor 38, 39 connected to another generator-starter 61, 62 is open, thereby firstly preventing two contactors 28, 29, 38, 39 that are connected to the same generator-starter 61, 62 being closed simultaneously, and secondly preventing two contactors 38, 39 that are connected to two distinct generator-starters 61, 62 being closed simultaneously, thus avoiding powering both generator-starters 61, 62 simultaneously, and thereby avoiding starting both engines 65, 66 simultaneously.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. An electrical architecture having paired secondary networks for an aircraft, the architecture comprising:
   two secondary electrical networks suitable for delivering respective secondary powers at respective secondary voltages, the two secondary electrical networks including a first secondary electrical network and a second secondary electrical network;
   one or more electrical components; and
   at least one source of electricity connected to at least one secondary electrical network;
   wherein a common electrical component is electrically connected to both the secondary electrical networks, each secondary electrical network includes a contactor enabling each secondary electrical network to be electrically connected with the common electrical component, and each contactor being interlinked so that one contactor cannot be closed so long as the other contactor is not open so that the common electrical component cannot be electrically connected simultaneously to both the secondary networks.

2. The electrical architecture according to claim 1, wherein the first secondary electrical network delivers secondary power at a first secondary voltage strictly less than a second secondary voltage of second electrical power delivered by the second secondary electrical network.

3. The electrical architecture according to claim 2, wherein the electrical architecture includes at least two sources of electricity, a first source of electricity being arranged on the first secondary electrical network and supplying the first secondary voltage to the first secondary electrical network, and a second source of electricity being arranged between the first secondary electrical network and the second secondary electrical network and supplying a voltage equal to the difference between the second secondary voltage and the first secondary voltage, such that the two sources of electricity operate in series and together supply the second secondary voltage to the second secondary electrical network.

4. The electrical architecture according to claim 1, wherein the common electrical component is a generator-starter connected to both of the secondary electrical networks, and the generator-starter is powered by a secondary electrical network in order to start a fuel-burning engine, the generator-starter, when operating as a generator, being a source of electricity for the other secondary electrical network.

5. The electrical architecture according to claim 1, wherein the electrical architecture includes a primary electrical network and a transformer-rectifier unit interconnected between the primary electrical network and the secondary electrical networks.

6. The electrical architecture according to claim 5, wherein the transformer-rectifier unit comprises:
   three-phase primary windings connected to the primary electrical network; and
   two secondary assemblies each provided respectively with at least one group of three-phase secondary windings and a rectifier bridge arranged between the at least one group of three-phase secondary windings and a secondary electrical network.

7. The electrical architecture according to claim 6, wherein the secondary assemblies are electrically connected in series such that a first secondary voltage of the first secondary electrical network is the electrical voltage across terminals of a first secondary assembly, and the second secondary voltage of the second secondary electrical network is the electrical voltage across the terminals of the two secondary assemblies taken together.

8. The electrical architecture according to claim 6, wherein the secondary assemblies are not electrically connected in series, such that a first secondary voltage of the first secondary electrical network is the electrical voltage across terminals of a first secondary assembly, and the second secondary voltage of the second secondary electrical network is the electrical voltage across the terminals of a second secondary assembly.

9. The electrical architecture according to claim 5, wherein the primary electrical network is a low voltage electrical network and the secondary electrical networks are very low voltage electrical networks.

10. The electrical architecture according to claim 9, wherein the electrical architecture includes a primary electrical network delivering three-phase AC power at a primary voltage of nominal value equal to 115 V, and two secondary electrical networks delivering DC power at secondary voltages having respective nominal values equal to 28 V and 56 V.

11. The electrical architecture according to claim 1, wherein a source of electricity is rechargeable electrical energy storage means, non-rechargeable electrical energy storage means, a generator-starter driven by an engine, or a generator driven mechanically by a main mechanical power transmission gearbox, an auxiliary power unit, or a ground power unit.

12. The electrical architecture according to claim 1, wherein the electrical architecture includes at least one additional secondary network.

13. A method of managing an electrical architecture having paired secondary networks for starting a fuel-burning engine of an aircraft, the electrical architecture having paired secondary networks comprising:

two secondary electrical networks suitable for delivering electrical secondary powers at a respective secondary voltage, the two secondary electrical networks including a first secondary electrical network and a second secondary electrical network;

one or more electrical components, at least one of which is a common electrical component, electrically connected to the secondary electrical networks;

at least one source of electricity connected to at least one secondary electrical network; and at least two contactors arranged on respective ones of the secondary electrical networks, each contactor enabling a secondary electrical network to be electrically connected with the common electrical component, each contactor being linked together in such a manner that a contactor cannot be closed so long as the other contactor is not open, so that the common electrical component cannot be electrically connected simultaneously to both secondary networks;

wherein the method comprises the following steps:

a first step of electrically powering the second secondary electrical network;

a second step of controlling opening of a first contactor arranged on a first secondary electrical power network;

a third step of closing a second contactor arranged on the second secondary electrical network;

a fourth step of electrically powering a common component by the second secondary electrical network;

a fifth step of opening the second contactor;

a sixth step of closing the first contactor; and a seventh step of electrically connecting the common component with the first secondary electrical network.

14. The method according to claim 13, wherein the second step of controlling the opening of a first contactor prevents execution of the third step of closing a second contactor so long as the first contactor is not open, so as to avoid both contactors being closed simultaneously.

15. The method according to claim 13, wherein the common component is a generator-starter connected to a fuel-burning engine, the fourth step of electrically powering the common component is a step of starting the fuel-burning engine, and the seventh step of electrically connecting the common component is a step of generating power for the first secondary electrical network.

16. The electrical architecture according to claim 1, wherein contactors are linked together electrically.

17. The electrical architecture according to claim 1, wherein each contactor comprises a power switch, four auxiliary contacts and a coil, the power switch serving to open and close an electrical connection between the common electrical component and a secondary network, the auxiliary contacts supplying information about the state of the power switch.

18. An electrical architecture having paired secondary networks for an aircraft, the architecture comprising:

two secondary electrical networks suitable for delivering respective secondary powers at respective secondary voltages, the two secondary electrical networks including a first secondary electrical network and a second secondary electrical network:

one or more electrical components; and at least one source of electricity connected to at least one secondary electrical network;

wherein a common electrical component is electrically connected to both the secondary electrical networks, each secondary electrical network includes a contactor enabling each secondary electrical network to be electrically connected with the common electrical component, and each contactor being interlinked so that one contactor cannot be closed so long as the other contactor is not open so that the common electrical component cannot be electrically connected simultaneously to both the secondary networks, wherein the electrical architecture includes a primary electrical network and a transformer-rectifier unit interconnected between the primary electrical network and the secondary electrical networks and wherein the transformer-rectifier unit comprises:

three-phase primary windings connected to the primary electrical network; and two secondary assemblies each provided respectively with at least one group of three-phase secondary windings and a rectifier bridge arranged between the at least one group of three-phase secondary windings and a secondary electrical network.

19. The electrical architecture according to claim 18, wherein the first secondary electrical network delivers secondary power at a first secondary voltage strictly less than a second secondary voltage of second electrical power delivered by the second secondary electrical network.

20. The electrical architecture according to claim 19, wherein the electrical architecture includes at least two sources of electricity, a first source of electricity being arranged on the first secondary electrical network and supplying the first secondary voltage to the first secondary electrical network, and a second source of electricity being arranged between the first secondary electrical network and the second secondary electrical network and supplying a voltage equal to the difference between the second secondary voltage and the first secondary voltage, such that the two sources of electricity operate in series and together supply the second secondary voltage to the second secondary electrical network.

* * * * *